United States Patent
Griese et al.

(10) Patent No.: US 7,365,046 B2
(45) Date of Patent: Apr. 29, 2008

(54) METHOD FOR STRIPPING FLOOR FINISHES USING COMPOSITION THAT THICKENS UPON DILUTION WITH WATER

(75) Inventors: Gregory G. Griese, Hudson, WI (US); Mark D. Levitt, Saint Paul, MN (US); Brian R. Leafblad, Saint Paul, MN (US); Minyu Li, Oakdale, MN (US); Robert D. P. Hei, Baldwin, WI (US)

(73) Assignee: Ecolab Inc., St. Paul, MN (US)

( * ) Notice: Subject to any disclaimer, the term of this patent is extended or adjusted under 35 U.S.C. 154(b) by 242 days.

(21) Appl. No.: 11/107,307

(22) Filed: Apr. 15, 2005

(65) Prior Publication Data

US 2006/0234889 A1 Oct. 19, 2006

(51) Int. Cl.
*C11D 17/00* (2006.01)

(52) U.S. Cl. .................. 510/417; 510/201; 510/206; 510/218; 134/38

(58) Field of Classification Search .................. None
See application file for complete search history.

(56) References Cited

U.S. PATENT DOCUMENTS

| | | | |
|---|---|---|---|
| 3,094,491 A | 6/1963 | Greminger et al. | |
| 3,664,962 A | 5/1972 | Kelly et al. | |
| 4,294,729 A | 10/1981 | Bakos et al. | |
| 4,445,939 A | 5/1984 | Hodson | |
| 4,517,330 A | 5/1985 | Zdanowski et al. | |
| 4,592,787 A | 6/1986 | Johnson | |
| 4,732,695 A | 3/1988 | Francisco | |
| 4,999,216 A | 3/1991 | Gaske et al. | |
| 5,080,822 A | 1/1992 | VanEenam | |
| 5,080,831 A | 1/1992 | VanEenam | |
| 5,091,211 A | 2/1992 | Richard | |
| 5,096,501 A | 3/1992 | Dishart et al. | |
| 5,158,710 A | 10/1992 | Van Eenam | |
| 5,319,018 A | 6/1994 | Owens et al. | |
| 5,364,551 A | 11/1994 | Lentsch et al. | |
| 5,419,848 A * | 5/1995 | VanEenam | 510/365 |
| 5,453,451 A | 9/1995 | Sokol | |
| 5,518,661 A | 5/1996 | Langford et al. | |
| 5,529,887 A | 6/1996 | Horn et al. | |
| 5,585,341 A | 12/1996 | Van Eenam | |
| 5,637,559 A | 6/1997 | Koreltz et al. | |
| 5,696,072 A | 12/1997 | Nercissiantz et al. | |
| 5,721,204 A | 2/1998 | Maxwell et al. | |
| 5,744,440 A | 4/1998 | Liu | |
| 5,773,487 A | 6/1998 | Sokol | |
| 5,783,538 A | 7/1998 | Totoki et al. | |
| 5,786,319 A | 7/1998 | Pedersen et al. | |
| 5,817,612 A | 10/1998 | Distaso | |
| 5,830,937 A | 11/1998 | Shalov et al. | |
| 5,849,682 A | 12/1998 | Van Eenam | |
| 6,010,995 A | 1/2000 | Van Eenam | |
| 6,096,383 A | 8/2000 | Berg et al. | |
| 6,150,320 A * | 11/2000 | McDonell et al. | 510/407 |
| 6,197,844 B1 | 3/2001 | Hamrock et al. | |
| 6,228,433 B1 | 5/2001 | Witt | |
| 6,316,535 B1 | 11/2001 | Caldwell et al. | |
| RE37,849 E | 9/2002 | Pokorny | |
| 6,544,942 B1 | 4/2003 | Smith et al. | |
| 6,583,101 B1 | 6/2003 | Wiseth et al. | |
| 6,586,380 B2 | 7/2003 | Marquis et al. | |
| 6,630,434 B2 | 10/2003 | Besse et al. | |
| 6,846,793 B1 | 1/2005 | Griese | |
| 2002/0028621 A1 | 3/2002 | Levitt et al. | |
| 2002/0082178 A1 | 6/2002 | Besse et al. | |
| 2002/0175092 A1 | 11/2002 | Stulens et al. | |
| 2003/0031801 A1 | 2/2003 | Olson et al. | |
| 2003/0119686 A1 | 6/2003 | Machac, Jr. et al. | |
| 2004/0086320 A1 | 5/2004 | Policicchio et al. | |
| 2004/0121932 A1 | 6/2004 | Griese et al. | |
| 2004/0127378 A1 | 7/2004 | Sherry et al. | |

FOREIGN PATENT DOCUMENTS

WO    WO 98/17734    4/1998

* cited by examiner

*Primary Examiner*—Gregory Webb
(74) *Attorney, Agent, or Firm*—Andrew D. Sorensen; Anneliese S. Mayer; Amy J. Hoffman

(57) ABSTRACT

A method for stripping a floor using a concentrate prepared by mixing a substantially nonchlorinated concentrate containing a floor finish solvent and an at least partially unactivated water thickener. The concentrate is diluted merely with water at an intended use location to activate the water thickener and noticeably increase within ten minutes or less the viscosity of the resulting mixture, then applied to a hardened floor finish atop a floor and allowed to soften or dissolve the floor finish so that the finish may be removed from the floor.

33 Claims, No Drawings

US 7,365,046 B2

METHOD FOR STRIPPING FLOOR FINISHES USING COMPOSITION THAT THICKENS UPON DILUTION WITH WATER

TECHNICAL FIELD

This invention relates to floor stripping and to the nondestructive removal of floor finishes.

BACKGROUND

Floor strippers may be used to remove worn or discolored floor finishes from flooring substrates (e.g., vinyl composition tiles) without harming the flooring substrate itself, so that a new finish may be applied. References relating to floor strippers include U.S. Pat. No. 5,158,710 (VanEenam '710), U.S. Pat. No. 5,419,848 (VanEenam '848), U.S. Pat. No. 5,585,341 (VanEenam '341), U.S. Pat. No. 5,637,559 (Koreltz et al.), U.S. Pat. No. 5,849,682 (VanEenam '682), U.S. Pat. No. 6,010,995 (VanEenam '995), U.S. Pat. No. 6,544,942 B1 (Smith et al.) and U.S. Pat. No. 6,583,101 B1 (Wiseth et al.).

SUMMARY OF THE INVENTION

Floor strippers are typically sold as concentrates intended to be diluted with water just prior to use, e.g., by mixing the concentrate with water in a mop bucket. The resulting diluted stripper typically has a viscosity no greater than and usually less than that of the concentrate. Some strippers "dewet" (appear to bead up or otherwise insufficiently wet) on a floor shortly after being applied, and may continue to dewet until the user swabs the stripper back and forth a few times as the floor finish softens. Additionally, the effectiveness of some formulations decreases during application as the solvents evaporate and as the stripper flows into undesired areas.

Less work during stripper application might be required if the stripper had a reduced tendency to dewet when first applied, evaporate during use, or flow into undesired areas (e.g., carpeting, flooring not being stripped, or areas under store displays and shelving). Stripper effectiveness over non-level or high spots might also be improved if the stripper had a reduced tendency to flow toward low spots within the area to be stripped.

The present invention provides, in one aspect, a method for stripping a floor comprising:
a) providing a substantially nonchlorinated concentrate comprising a floor finish solvent and an at least partially unactivated water thickener;
b) diluting the concentrate merely with water at an intended use location to activate the water thickener and noticeably increase within ten minutes or less the viscosity of the resulting mixture;
c) applying the resulting thickened stripper to a hardened floor finish atop a floor;
d) allowing the applied stripper to soften or dissolve the floor finish; and
e) removing the softened or dissolved finish from the floor.

DETAILED DESCRIPTION

The phrase "stripping a floor" refers to removing, at such time as it may be desired to do so, a hardened floor finish from an underlying installed flooring substrate without removing substantial portions of the flooring substrate. Such removal may use minimally abrasive measures such as application of the disclosed stripper followed by rinsing using, e.g., water or a detergent solution, and may if desired be accompanied by more abrasive but flooring-safe measures such as use of a nonwoven floor scrub pad, but can be carried out without requiring a flooring-damaging removal step such as sanding.

The phrase "hardened floor finish" refers to an applied liquid coating that through a chemical or physical process (including solvent evaporation or other drying processes, photochemical reactions, electrochemical reactions, radical processes, thermal processes, ionic processes, moisture cure processes or multiple-component (e.g., two- or three-component) crosslinking processes) has become dried, crosslinked or otherwise cured in situ to form a tack-free film on a floor.

The word "concentrate" refers to a composition intended to be diluted with water before use. The phrase "substantially nonchlorinated" refers to a concentrate that does not contain objectionable quantities of chlorinated solvents (e.g., methylene chloride) whose presence could pose a health hazard to users. The phrase "diluting the concentrate merely with water" refers to mixing a concentrate with water (e.g., plain tap water containing substantially no other required ingredients) in an amount sufficient to at least double the volume of the resulting mixture. The phrase "at an intended use location" refers to carrying out such diluting at or near (e.g., in the same building as) a floor to be stripped.

The phrase "floor finish solvent" refers to an organic liquid that can dissolve, soften or otherwise assist in removing a hardened floor finish from a floor (including organic cosolvents that assist in dissolving a solvent in a concentrate, help maintain the concentrate in a desirable physical state during storage, ease dilution of the concentrate with water, reduce cost, reduce odor or provide some other desirable packaging, storage or use benefit).

The phrase "at least partially unactivated water thickener" refers to a material that will increase the viscosity of a diluted mixture of water and the concentrate compared to that of a similarly diluted mixture of water and the other concentrate ingredients prepared without the water thickener. Such activation may occur using a variety of mechanisms, e.g., by a change in one or more factors such as the water thickener's extent of hydration, association, neutralization or crosslinking, or by a change in a water thickener's molecular configuration. For example the water thickener may change from an unhydrated or only partially hydrated state to a fully hydrated state when the concentrate is diluted with water.

A variety of floor finish solvents may be employed in the disclosed stripping method. Representative floor finish solvents include alcohols (e.g., cyclic alcohols), amides, ethers (e.g., hydroxyethers), ketones, dialkyl carbonates, essential oils, esters (e.g., cyclic esters, dibasic esters and phthalate esters), oxygenated solvents (e.g, glycol ethers) and mixtures thereof. Some materials may serve as a solvent in some concentrates or in some stripping applications, and as a cosolvent in combination with one or more solvents in other concentrates or in other stripping applications. Representative solvents include acetamidophenol, acetanilide, acetophenone, 2-acetyl-1-methylpyrrole, benzyl acetate, benzyl alcohol, benzyl benzoate, benzyloxyethanol, ethylene glycol phenyl ether (commercially available as "DOWANOL™ EPh" from Dow Chemical Co.), propylene glycol phenyl ether (commercially available as "DOWANOL PPh" from Dow Chemical Co.), 2-(2-aminoethoxy)ethanol, monoethanolamine, diethanolamine, triethanolamine, amyl acetate, amyl alcohol, butanol, 3-butoxyethyl-2-propanol, butyl acetate, n-butyl propionate, cyclohexanone, diacetone alcohol, diethoxyethanol, diethylene glycol methyl ether, diisobutyl carbinol, diisobutyl ketone, dimethyl heptanol, dipropylene glycol tert-butyl ether, ethanol, ethyl acetate, 2-ethylhexanol, ethyl propionate, ethylene glycol methyl ether acetate, hexanol, isobutanol, isobutyl acetate, isobutyl heptyl ketone, isophorone, isopropanol, isopropyl acetate, methanol, methyl amyl alcohol, methyl n-amyl ketone, 2-methyl-1-butanol, methyl ethyl ketone, methyl isobutyl ketone, 1-pentanol, n-pentyl propionate, 1-propanol, n-propyl acetate, n-propyl propionate, propylene glycol ethyl ether, tripropylene glycol methyl ether (commercially available as DOWANOL TPM from Dow Chemical Co.), tripropylene glycol n-butyl ether (commercially available as DOWANOL TPNB from Dow Chemical Co.), diethylene glycol n-butyl ether acetate (commercially available as Butyl CARBITOL™ acetate from Dow Chemical Co.), diethylene glycol monobutyl ether (commercially available as Butyl CARBITOL from Dow Chemical Co.), ethylene glycol n-butyl ether acetate (commercially available as Butyl CELLOSOLVE™ acetate from Dow Chemical Co.), ethylene glycol monobutyl ether (commercially available as Butyl CELLOSOLVE from Dow Chemical Co.), dipropylene glycol monobutyl ether (commercially available as Butyl DIPROPASOL™ from Dow Chemical Co.), propylene glycol monobutyl ether (commercially available as Butyl PROPASOL from Dow Chemical Co.), ethyl 3-ethoxypropionate (commercially available as UCAR™ Ester EEP from Dow Chemical Co.), 2,2,4-Trimethyl-1,3-Pentanediol Monoisobutyrate (commercially available as UCAR Filmer IBT from Dow Chemical Co.), diethylene glycol monohexyl ether (commercially available as Hexyl CARBITOL from Dow Chemical Co.), ethylene glycol monohexyl ether (commercially available as Hexyl CELLOSOLVE from Dow Chemical Co.), diethylene glycol monomethyl ether (commercially available as Methyl CARBITOL from Dow Chemical Co.), diethylene glycol monoethyl ether (commercially available as CARBITOL from Dow Chemical Co.), ethylene glycol methyl ether acetate (commercially available as Methyl CELLOSOLVE acetate from Dow Chemical Co.), ethylene glycol monomethyl ether (commercially available as Methyl CELLOSOLVE from Dow Chemical Co.), dipropylene glycol monomethyl ether (commercially available as Methyl DIPROPASOL from Dow Chemical Co.), propylene glycol methyl ether acetate (commercially available as Methyl PROPASOL™ acetate from Dow Chemical Co.), propylene glycol monomethyl ether (commercially available as Methyl PROPASOL from Dow Chemical Co.), diethylene glycol monopropyl ether (commercially available as Propyl CARBITOL from Dow Chemical Co.), ethylene glycol monopropyl ether (commercially available as Propyl CELLOSOLVE from Dow Chemical Co.), dipropylene glycol monopropyl ether (commercially available as Propyl DIPROPASOL from Dow Chemical Co.) and propylene glycol monopropyl ether (commercially available as Propyl PROPASOL from Dow Chemical Co.). Representative dialkyl carbonates include dimethyl carbonate, diethyl carbonate, dipropyl carbonate, diisopropyl carbonate and dibutyl carbonate. Representative essential oils include benzaldehyde, pinenes (alphas, betas, etc.), terpineols, terpinenes, carvone, cinnamealdehyde, borneol and its esters, citrals, ionenes, jasmine oil, limonene, dipentene, linalool and its esters. Representative dibasic esters include dimethyl adipate, dimethyl succinate, dimethyl glutarate, dimethyl malonate, diethyl adipate, diethyl succinate, diethyl glutarate, dibutyl succinate, dibutyl glutarate and products available under the trade designations DBE™, DBE-3, DBE-4, DBE-5, DBE-6, DBE-9, DBE-IB, and DBE-ME from DuPont Nylon. Representative phthalate esters include dibutyl phthalate, diethylhexyl phthalate and diethyl phthalate. Preferred floor finish solvents include benzyl alcohol, dibasic esters, essential oils, dialkyl carbonates, ethylene glycol monobutyl ether, diethylene glycol monobutyl ether, ethylene glycol phenyl ether, propylene glycol phenyl ether and mixtures thereof. The floor finish solvent(s) (including cosolvent(s), if employed), may collectively represent for example at least 20%, at least 30%, at least 40%, at least 50%, at least 60%, at least 70%, at least 80% or at least 90% of the total concentrate weight.

A variety of water thickeners may be employed in the disclosed concentrate and stripping method. Representative water thickeners include gums and other polysaccharides such as carrageenan, cassia gum, diutan gum, gellan gum, guar gum, Gum Arabic, Gum Tragacanth, locust bean gum, whelan gum and Xanthan gum; alginates such as agar; cellulose ethers such as ethyl cellulose, hydroxyethyl cellulose, ethyl hydroxyethyl cellulose, methyl cellulose, hydroxypropyl cellulose, hydroxypropyl methyl cellulose, and other alkyl or hydroxyalkyl cellulose ethers; acrylic acid copolymers; polyethylene oxides (e.g., high molecular weight polyethylene oxides) such as polyethylene glycols and methoxypolyethylene glycols; polyvinyl alcohols; polyvinyl pyrrolidone; starches; methyl vinyl ether/maleic anhydride copolymers; and mixtures thereof. Representative commercially available water thickeners include Xanthan gums such as KELZAN™, KELZAN AR, KELZAN ASX, KELZAN ASX T, KELZAN CC, KELZAN HP, KELZAN RD, KELZAN S, KELZAN ST, KELZAN T, KELTROL™, KELTROL T and KELTROL TF (all from CP Kelco) and VANZAN™ and VANZAN D (both from R.T. Vanderbilt Co.); diutan gums such as GEOVIS™ XT, KELCO-CRETE™ 80, KELCO-CRETE 200 and KOC617 (all from CP Kelco); gellan gums such as KELCOGEL™, KELCOGEL F and KELCOGEL LT 100 (all from CP Kelco); carrageenan gums such as GENUVISCO™ X-906-02 (from CP Kelco), hydrocolloids such as NOVEGUM™ C865, NOVEGUM C866 and NOVEGUM G888 (all from Noveon, Inc.); natural or synthetic clays including bentonite, hectorite, smectite and other silicates such as available grades of BENTOLITE™, CLAYTONE™ and GELWHITE™ bentonites, PERMON™ smectites, CLOISITE™ magnesium aluminum silicates, LAPONITE™ silicates and GARAMITE™ silicates (all available from Southern Clay Products, Inc.) and available grades of OPTIGEL™ bentonites, hectorites, smectites and other clays (all available from Sud-Chemie Group); homopolymers or copolymers of acrylic acid, e.g., those which may be neutralized with a salt including ACCUSOL™ 810, ACCUSOL 820 and ACCUSOL 830 acrylate polymers (all from Rohm & Haas Co.) or those which may be crosslinked (e.g., with a polyalkenyl polyether) including CARBOPOL™ 674, CARBOPOL 676, CARBOPOL ETD 2691, CARBOPOL ETD 2623, CARBOPOL EZ-3, CARBOPOL EZ-3A, CARBOPOL EZ-4 and CARBOPOL ULTREZ™ 21 (all from Noveon, Inc.); PEMULEN™ 1622 copolymer (Noveon, Inc.); cellulose ethers such as METHOCEL™ K15MDGSE, METHOCEL K4MDGSE, METHOCEL 311, METHOCEL F4M PRG and METHOCEL OS (all from Dow Chemical Company), XDS 8898.5 cellulose ether (Dow Chemical Company); hydroxypropyl cellulose ethers such as KLUCEL™ H, KLUCEL M or KLUCEL G (all from Hercules Inc.) and available grades of OPTIFLO™ associative thickeners (all available from Sud-Chemie Group). The amount of water thickener may vary depending on factors such as the chosen floor finish solvent, the possible presence of water in the concentrate (which may result in partial activation of the water thickener before dilution at the intended use location), the desired dilution level, the desired thickening rate following mixing, the desired degree of thickening for the given intended use and other factors that will be familiar to those skilled in the art. As a general guide, the amount of water thickener may be about 0.1 to about 10%, about 2 to about 8% or about 3 to about 8% of the total concentrate weight.

The concentrate may also contain antisettling agents that may help discourage settling or sedimentation of the water thickener before the concentrate is diluted with water. Representative antisettling agents include many of the water thickening agents listed above (e.g., natural or synthetic clays) as well as materials that discourage such settling or sedimentation but which do not serve as water thickeners.

The concentrate may and preferably will contain one or more surfactants. Representative surfactants will be familiar to those skilled in the art, and include anionic, cationic, amphoteric and nonionic surfactants, and mixtures thereof. Exemplary anionic surfactants include alkylbenzene sulfonates (e.g., $C_6$-$C_{24}$ alkylbenzene sulfonates), olefin sulfonates (e.g., $C_6$-$C_{24}$ olefin sulfonates), paraffin sulfonates (e.g., $C_6$-$C_{24}$ paraffin sulfonates), cumene sulfonate, xylene sulfonate, alcohol sulfates (e.g., $C_6$-$C_{24}$ or $C_6$-C12 alcohol sulfates), alcohol ether sulfates having 1 to about 20 ethylene oxide groups, and mixtures thereof.

Exemplary cationic surfactants include quaternary amine compounds having the formula:

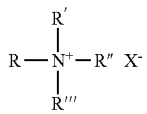

where R, R', R" and R'" are each an alkyl, aryl or aralkyl group (e.g., a $C_6$-$C_{24}$ alkyl, aryl or aralkyl group) which can optionally contain one or more P, O, S or N heteroatoms, and X is F, Cl, Br, I or an alkyl sulfate.

Exemplary amphoteric surfactants include amine oxide compounds having the formula:

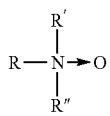

where R, R' and R" are as defined above, and mixtures thereof.

Exemplary amphoteric surfactants also include betaine compounds having the formula:

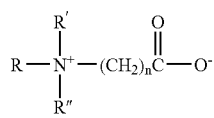

where R, R' and R" are as defined above and n is about 1 to about 10, and mixtures thereof.

Exemplary nonionic surfactants include alcohol ethoxylates (e.g., $C_6$-$C_{24}$ or $C_6$-$C_{14}$ alcohol ethoxylates) having 1 to about 20 ethylene oxide groups (e.g., about 9 to about 20 ethylene oxide groups), alkylphenol ethoxylates (e.g., $C_6$-$C_{24}$ or $C_8$-$C_{10}$ alkylphenol ethoxylates) having 1 to about 100 ethylene oxide groups (e.g., about 12 to about 20 ethylene oxide groups), alkylpolyglycosides (e.g., $C_6$-$C_{24}$ or $C_6$-$C_{20}$ alkylpolyglycosides) having 1 to about 20 glycoside groups (e.g., about 9 to about 20 glycoside groups), and mixtures thereof.

The amount of surfactant may vary depending on factors such as the chosen floor finish solvent, the possible presence of water in the concentrate, the desired dilution level, the desired thickening rate following mixing, the desired degree of thickening for the given intended use and other factors that will be familiar to those skilled in the art. As a general guide, the amount of surfactant may be about 0.1 to about 50%, about 0.1 to about 15% or about 2 to about 15% of the total concentrate weight.

The concentrate may contain other adjuvants including biocides, abrasive particles, chelants, builders, defoamers, fragrances, dyes, indicators, colorants, pH adjusters, anti-corrosion additives, antirust additives, light stabilizers and antioxidants. The types and amounts of such adjuvants will be apparent to those skilled in the art. The concentrate may also contain a limited amount of water, provided that the amount is such that the water thickener is partially but not fully activated and can become fully activated upon dilution of the concentrate with water at an intended use location. The water amount may be for example less than 3%, less than 2% or less than 1% of the total concentrate weight.

The concentrate may be manufactured by merely mixing the ingredients. The concentrate may also be manufactured by adding the water thickener and other desired ingredients to a commercial stripper (which may be modified as needed to remove some or all of any water that may be present so as to avoid fully activating the water thickener) such as HAWK™, FREEDOM™ and CARE STRIP LOW ODOR™ stripper concentrates from Ecolab Inc.; JUGGERNAUT™ stripper concentrate from Buckeye International, Inc.; and TWIST AND FILL™ stripper concentrate from 3M. The concentrate may be packaged in any convenient form including bottles, drums, dispensers intended to be carried by a user during stripper application and dispensers intended to be replaceably installed in a mixing or dispensing device (e.g., a wall-mounted, freestanding or benchtop dispensing station). Such packaging may include a first container containing primarily the floor finish solvent and a second container containing at least partially unactivated water thickener, with the two containers being mixed together at the intended point of use and dilution. The types and design of suitable packaging will be familiar to those skilled in the art. Desirably the concentrate is homogenous (viz., has a single phase appearance), or is homogenous for a desirable period of time (e.g., 1 minute or more, 5 minutes or more or 10 minutes or more) after being shaken to redisperse any separated thickener particles.

A variety of flooring substrates may be stripped using the disclosed method. Exemplary flooring substrates include resilient flooring substrates such as vinyl composition tiles, vinyl sheet flooring, linoleum, rubber sheeting, rubber tile, cork, synthetic sports flooring and vinyl asbestos tile, and non-resilient flooring substrates such as terrazzo, concrete, wood flooring, bamboo, wood laminate, engineered wood products (e.g. wood epoxy blends, permanently coated substrates such as those available under the names PERGO™ and PARQUET™), stone, marble, slate, ceramic tile, grout, and dry shake flooring. The coatings can be applied at a variety of jobsites, including indoor and outdoor sites involving new or existing residential, commercial and government- or agency-owned sites.

A variety of floor finishes may be stripped using the disclosed method. Representative commercially available floor finishes include PADLOCK™, GEMSTAR LASER™, GEMSTAR POLARIS™, RIVE™, and TAJ MAHAL™ acrylic floor finishes, GLOSSTEK 100™ and ORION™ polyurethane floor finishes, and COURTMASTER II™, ISI STAR™, TUKLAR MEDICAL™ floor finishes, all from Ecolab Inc.; CORNERSTONE™ and TOPLINE™ acrylic floor finishes from 3M; BETCO BEST™ floor finish from Betco Corp.; HIGH NOON™ acrylic finish from Butchers; CITATION™ and CASTLEGUARD™ acrylic finishes from Buckeye International, Inc., COMPLETE™, SIGNATURE™, TECHNIQUE™ and VECTRA™ acrylic floor finishes from SC Johnson Professional Products; OVER AND UNDER™ floor sealer from S. C. Johnson Professional Products; SPLENDOR™, DECADE 90™, PRIME SHINE™ ULTRA and PREMIER™ acrylic finishes and FIRST ROUND and FORTRESS™ urethane acrylic finishes from Minuteman, International, Inc.; ACRYL-KOTE™ Seal and Finish and PREP Floor Seal from Minuteman, International, Inc.; ULTRA TC™ and UV I-FINISH™ UV-curable finishes from Minuteman, International, Inc; FLOORSTAR™ Premium 25 floor finish from ServiceMaster, Inc.; and UPPER LIMITS™ acrylic finish and ISHINE™ optically brightened floor finish from Spartan Chemical Co. Other suitable floor finishes may be based on film formers including No. AD200C1 polyester polyurethane formulation from Air Products and Chemicals, Inc.; LAROMER™ PE 22 WN polyester acrylate emulsion, LAROMER LR 8949 aqueous radiation curable aliphatic polyurethane dispersion and LAROMER LR 8983 aqueous radiation curable aromatic polyurethane dispersion, all from BASF Corp.; No. MG98-040 polyester polyurethane formulation from Bayer AG; MEGATRAN™ 205 zinc crosslinked acrylic dispersion and SYNTRAN™ 1580 zinc crosslinked acrylic dispersion from Interpolymer Corp.; MORGLO™ zinc crosslinked acrylic dispersion and MORGLO2™ acrylic styrene polymer emulsion, both from Omnova Solutions Inc.; STAY-CLAD™ 5900 hydroxyl-functional acrylic polymer dispersion from Reichhold, Inc.; DURAPLUS™ 2 modified acrylic low odor mixed-metal crosslinked polymer, DURAPLUS 3 zinc crosslinked acrylic dispersion, DURA-GREEN™ MF 1 metal free acrylic polymer emulsion, PRIMAL™ B-336AFK modified acrylic zinc crosslinked polymer, PRIMAL B-924ER zinc crosslinked, all acrylic polymer emulsion, PRIMAL E-2483 metal crosslinked acrylic polymer, PRIMAL E-3188 waterborne acrylic polymer dispersion, PRIMAL NT-2624 metal-free polymer, PRIMAL NT-6035 metal-free polymer, RHOPLEX™ B-924 all-acrylic metal-crosslinked floor polish polymer, RHOPLEX 1421 zinc crosslinked acrylic dispersion, RHOPLEX B-1604 metal-crosslinked modified acrylic polymer, RHOPLEX NT-2624 metal crosslinker-free modified acrylic polish, RHOPLEX 3479 low foaming metal-crosslinked modified acrylic polymer, ROSHIELD™ 3120 UV curable acrylate coating and UHS Plus™ metal-crosslinked modified acrylic polymer, all from Rohm & Haas Co.; VLAKTIN™ VTE 6155 aliphatic urethane acrylate, VTE 6165 aromatic urethane acrylate and VTE 6169 aliphatic polyester urethane radiation curing resins, all from Solutia, Inc.; Nos. 979-1 and 980-3 polyester polyurethane formulations from U.S. Polymers, Inc.; the ZVOC™ series of UV curable coatings from UV Coatings Limited; No. G-2029 acrylic polyurethane formulation and NEORAD™ NR-3709 UV curable aliphatic urethane coating from Zeneca Resins; 98-283W urethane acrylate from Hans Rahn & Co.; and materials such as those described in U.S. Pat. Nos. 4,517,330, 4,999,216, 5,091,211, 5,319,018, 5,453,451, 5,773,487, 5,830,937, 6,096,383, 6,197,844, 6,228,433. 6,316,535 B1, 6,544,942 B1, U.S. Patent Application Publication No. US 2002/0028621 A1, and in the patents cited therein. The floor finishes may include water-soluble or water-dispersible film formers such as metal-free acrylic finishes, acid-containing polymers crosslinked using transition metals, and water-soluble or water-dispersible multicomponent (e.g., two component) polyurethanes. The floor finish may contain mixtures of film formers.

The concentrate may be diluted merely with water at the intended use location. Ordinary tap water, softened water or process water may be employed. The concentrate:water dilution ratio is at least 1:1 by volume, and may be for example at least 1:2, at least 1:3, at least 1:4, at least 1:5, at least 1:6, at least 1:8, at least 1:10 or more. A variety of mixing methods may be employed. Mixing in a mop bucket is one such method and may be preferred. The diluted concentrate:water mixture may be stirred as needed and if desired allowed to stand for a time sufficient to activate the water thickener and noticeably increase the mixture viscosity. A noticeable viscosity increase may take place within ten minutes or less, e.g., within 5 minutes or less, within 4 minutes or less, within 3 minutes or less, within 2 minutes or less or within 1 minute or less. These recited times do not preclude the possibility that a further viscosity increase may continue to take place thereafter. The hardened floor finish can optionally be abraded With a suitably mild abrasive (e.g., a green or black SCOTCH-BRITE™ Floor Maintenance pad from 3M) prior to applying the thickened stripper. The thickened stripper may be applied using techniques that will be familiar to those skilled in the art (e.g., using a flat or string mop, squeegee, roller or towel). The applied stripper should be allowed to stand for a suitable time (e.g., for a minute or more, and typically between about 5 and about 20 minutes) while it softens the floor finish. The softened finish may be removed using a variety of techniques that will be familiar to those skilled in the art including vacuuming, mopping, scrubbing or wiping. The stripped floor may be allowed to dry and a layer or layers of floor finish applied and caused or allowed to harden.

The invention is further illustrated in the following non-limiting examples, in which all parts and percentages are by weight unless otherwise indicated.

EXAMPLE 1

A concentrate was prepared by mixing 98% benzyl alcohol and 2% VANZAN Xanthan gum (R.T. Vanderbilt Co.). The concentrate was diluted with tap water at a 2:25 concentrate:water ratio, mixed and allowed to stand for several minutes, resulting in formation of a thickened stripper mixture. Using a cotton towel, the thickened stripper was applied to a vinyl tile floors coated with three hardened coats of GEMSTAR LASER finish or three hardened coats of ISI STAR finish (both available from Ecolab, Inc.) which had been applied using a 50 m²/L (2000 ft²/gallon) coating rate. The thickened stripper mixture applied easily, and did not appear to dewet. The applied stripper was allowed to stand for 10 minutes, then scrubbed using a "swing machine" style electric floor scrubber equipped with a black nonwoven scrub pad. The softened floor finish was removed using a wet/dry shop vacuum. Both finishes were completely stripped.

EXAMPLE 2

Additional Xanthan gum was added with stirring to the diluted Example 1 concentrate until the mixture attained a viscosity of about 13,000 cps (as measured using a BROOKFIELD™ viscometer and Spindle No. 3 operated at 6 rpm).

water to produce a final mixture containing 77.15% water, 21.77% benzyl alcohol and 1.08% Xanthan gum. Using a 15 minute standing time following application, the thickened stripper mixture was used to completely strip a vinyl tile floor coated with five coats of hardened GEMSTAR LASER finish which had been applied using a 50 m²/L (2000 ft²/gallon) coating rate.

EXAMPLE 5

Using the method of Example 1, concentrates were made by mixing 98% benzyl alcohol with 2% of a thickener from Table 1 below. A second set of concentrates was made by mixing 98% DOWANOL EPh ethylene glycol phenyl ether (Dow Chemical Co.) with 2% of the same Table 1 thickeners. The thickeners used in the various concentrates for either solvent are identified as Formulation 5-1 through 5-7 in Table 1.

TABLE 1

| Thickener | Form. 5-1 | Form. 5-2 | Form. 5-3 | Form. 5-4 | Form. 5-5 | Form. 5-6 | Form. 5-7 |
|---|---|---|---|---|---|---|---|
| KELTROL T Xanthan gum[1] | 2% | | | | | | |
| KELZAN ASX Xanthan gum, 42 mesh[1] | | 2% | | | | | |
| KELZAN ASX T Xanthan gum, 42 mesh[1] | | | 2% | | | | |
| KELCOGEL gellan gum, 42 mesh[1] | | | | 2% | | | |
| KELZAN T Xanthan gum, 80 mesh[1] | | | | | 2% | | |
| KOC617 diutan gum, 200 mesh[1] | | | | | | 2% | |
| VANZAN Xanthan gum[2] | | | | | | | 2% |

[1]CP Kelco.
[2]R. T. Vanderbilt Co.

Continued addition of Xanthan gum to the Example 1 concentrate increased the diluted mixture viscosity to about 17,000 cps using the same measurement conditions.

EXAMPLE 3

Using the method of Example 2, a concentrate was prepared by mixing 80% benzyl alcohol, 0.5% PEMULEN 1622 copolymer thickener (Noveon, Inc.) and 19.5% monoisopropylamine. This concentrate provided a thickened liquid when diluted at a 1:10 ratio with water.

An additional concentrate was prepared by mixing 99.5% benzyl alcohol and 0.5% PEMULEN 1622 copolymer and diluted 1:10 with water. The resulting mixture provided a noticeably thickened liquid in a first run but did not do so in a second run. A noticeably thickened liquid was obtained when the concentrate ingredients were changed to a mixture of 99% benzyl alcohol and 1% PEMULEN 1622 polymer or 98% benzyl alcohol and 2% KELZAN AR Xanthan gum (CP Kelco, Inc.).

EXAMPLE 4

Using the method of Example 1, a concentrate was prepared by mixing benzyl alcohol with Xanthan gum, and The concentrates were placed in glass vials and mixed for 4 hours using a paint shaker. The vials were then allowed to stand for 3 hours and examined to evaluate the dispersion uniformity. All the vials exhibited some solid precipitation after the three hour standing time. The particle size of any non-dispersed material and the speed at which the separated material redispersed after mixing was evaluated by inverting the vials and observing the movement of solid precipitates at the bottom of the vials. Formulation 5-6 made using KOC617 diutan gum appeared to provide the best results in this trial using either benzyl alcohol or ethylene glycol phenyl ether as the solvent, as it exhibited a more uniform dispersion with smaller particles left on the container wall and more rapid redispersion than was observed for the other formulations.

The resulting 14 concentrates were diluted 1:5 with water and mixed for 3-5 minutes. All the formulations thickened upon dilution. The resulting gels were visually examined for uniformity. When using benzyl alcohol as the solvent, Formulation 5-6 formed the most uniform gel. When using ethylene glycol phenyl ether as the solvent, Formulations 5-1, 5-5, 5-6 and 5-7 formed the most uniform gels.

EXAMPLE 6

Using the method of Example 1, a concentrate was prepared by mixing the ingredients shown below in Table 2:

TABLE 2

| Ingredient | Amount, % |
|---|---|
| DOWANOL EPh ethylene glycol phenyl ether[1] | 23.7 |
| N-cyclohexyl-2-pyrrolidone | 23.7 |
| Cumenesulfonic acid | 8.1 |
| Monoethanolamine | 4.4 |
| MONAZOLINE ™ O imidazoline[2] | 0.6 |
| NAXAN AAL naphthalene sulfonates[3] | 18.7 |
| Butyl CARBITOL diethylene glycol monobutyl ether[3] | 18.7 |
| KOC617 Diutan Gum thickener[4] | 2.0 |

[1]Dow Chemical Co.
[2]Uniqema
[3]Rütgers Organics Corp.
[3]CP Kelco.

The resulting concentrate was diluted with water and used to strip a vinyl tile floor coated with five hardened coats of GEMSTAR LASER finish or five hardened coats of ISI STAR finish which had been applied using a 50 m²/L (2000 ft²/gallon) coating rate.

EXAMPLE 7

Using the method of Example 1, a series of concentrates was prepared by mixing the ingredients shown below in Table 3:

TABLE 3

| Ingredient | Form. 7-1 | Form. 7-2 | Form. 7-3 | Form. 7-4 | Form. 7-5 |
|---|---|---|---|---|---|
| Benzyl alcohol | 88% | 88% | 88% | 73.0% | 85.5% |
| KOC617 diutan gum | 2.0% | 2.0% | 2.0% | 2.0% | 2.0% |
| DYTEK ™ EP 1,3-pentanediamine[1] | 10.0% | | | | |
| Hexamethylene diamine | | 10.0% | | | |
| Methylpentamethylene diamine | | | 10.0% | | |
| Mixture of 1% KLUCEL H hydroxypropyl cellulose ether[2] in benzyl alcohol | | | | 25% | 12.5% |

[1]E. I. duPont de Nemours and Co.
[2]Hercules, Inc.

Formulations 7-1 and 7-3 through 7-5 were diluted with water and used to strip a vinyl tile floor coated with one coat of ORION two-part polyurethane finish or with a laminate finish system employing one coat of PADLOCK finish followed by one coat of ORION finish. The stripper formulations were applied to the finish, allowed to stand for 20 minutes and evaluated to determine the percent finish removed based on the stripper contact area. The laminate finish was more readily stripped, with Formulations 7-1 and 7-5 removing 100% of the laminate finish. Formulations 7-3 and 7-4 removed progressively lower amounts of the laminate finish. The formulations removed some but not all of the non-laminate finish. The respective stripping performances for the non-laminate finish were Formulation 7-5>Formulation 7-1>Formulation 7-4>Formulation 7-3.

EXAMPLE 8

Using the method of Example 1, a series of concentrates was prepared by mixing the ingredients shown below in Table 4.

TABLE 4

| Ingredient | Form. 8-1 | Form. 8-2 | Form. 8-3 | Form. 8-4 | Form. 8-5 |
|---|---|---|---|---|---|
| DOWANOL EPh ethylene glycol phenyl ether[1] | 23.7% | 23.7% | 23.7% | 23.7% | 23.7% |
| n-Cyclohexyl cyclopyrrolidone | 23.7% | | | | |
| n-Methyl pyrrolidone | | 23.7% | | | |
| N-hydroxyethyl pyrrolidone | | | 23.7% | | |
| DBE-3 dibasic esters[2] | | | | 23.7% | |
| AMP-95 2-amino-2-methyl-1-propanol containing 5% water[3] | | | | | 23.7% |
| Cumene sulfonic acid | 8.1% | 8.1% | 8.1% | 8.1% | 8.1% |
| Monoethanolamine | 4.4% | 4.4% | 4.4% | 4.4% | 4.4% |
| MONAZOLINE O oleic imidazoline[4] | 0.60% | 0.60% | 0.60% | 0.60% | 0.60% |
| Butyl CARBITOL diethylene glycol monobutyl ether[1] | 18.7% | 18.7% | 18.7% | 18.7% | 18.7% |
| NAXAN AAL naphthalene sulfonate[5] | 18.7% | 18.7% | 18.7% | 18.7% | 18.7% |
| KOC617 diutan gum[6] | 2.0% | 2.0% | 2.0% | 2.0% | 2.0% |

[1]Dow Chemical Co.
[2]Dupont Nylon.
[3]Angus Chemical Co.
[4]Uniqema.
[5]Rütgers Organics Corp.
[6]CP Kelco.

Each concentrate formula was diluted 1:10 with water, allowed to thicken, and applied to a vinyl tile floor coated with five coats of hardened GEMSTAR LASER finish which had been applied using a 50 m²/L (2000 ft²/gallon) coating rate. The stripper formulations were allowed to stand on the floor finish for 10 minutes. In each case the stripper completely removed the finish.

The concentrates were also evaluated to determine the stability of each emulsion against separation. The respective emulsion stabilities decreased in the order Formulation 8-3>Formulation 8-2>Formulation 8-1>Formulation 8-5>Formulation 8-4.

EXAMPLE 9

Using the method of Example 1, a series of concentrates was prepared by mixing the ingredients shown below in Table 5.

TABLE 5

| Ingredient | Form. 9-1 | Form. 9-2 | Form. 9-3 | Form. 9-4 |
|---|---|---|---|---|
| DOWANOL EPh ethylene glycol phenyl ether[1] | 23.7% | 23.7% | 23.7% | 23.7% |
| DBE dibasic esters[2] | 23.7% | | | |
| DBE-4 dibasic esters[2] | | 23.7% | | |
| DBE-5 dibasic esters[2] | | | 23.7% | |
| DBE-6 dibasic esters[2] | | | | 23.7% |
| Cumene sulfonic acid | 8.1% | 8.1% | 8.1% | 8.1% |
| Monoethanolamine | 4.4% | 4.4% | 4.4% | 4.4% |
| MONAZOLINE O oleic imidazoline[3] | 0.60% | 0.60% | 0.60% | 0.60% |
| Butyl CARBITOL diethylene glycol monobutyl ether[1] | 18.7% | 18.7% | 18.7% | 18.7% |
| NAXAN AAL naphthalene sulfonate[4] | 18.7% | 18.7% | 18.7% | 18.7% |
| KOC617 diutan gum[5] | 2.0% | 2.0% | 2.0% | 2.0% |

[1]Dow Chemical Co.
[2]Dupont Nylon.
[3]Uniqema.
[4]Rütgers Organics Corp.
[5]CP Kelco.

Each concentrate formula was diluted 1:10 with water, allowed to thicken, and applied to a vinyl tile floor coated with five coats of hardened GEMSTAR LASER finish which had been applied using a 50 m²/L (2000 ft²/gallon) coating rate. The stripper formulations were allowed to stand on the floor finish for 10 minutes. In each case the stripper completely removed the finish.

The concentrates were also evaluated to determine the stability of each emulsion against separation. The respective emulsion stabilities decreased in the order Formulation 9-4>Formulation 9-3>Formulation 9-2>Formulation 9-1.

EXAMPLE 10

Using the method of Example 1, concentrates were prepared by mixing the ingredients shown below in Table 6.

TABLE 6

| Ingredient | Form. 10-1 | Form. 10-2 |
|---|---|---|
| DOWANOL EPh ethylene glycol phenyl ether[1] | 23.7% | 23.7% |
| N-hydroxyethyl pyrrolidone | 23.7% | |
| DBE-5 dibasic esters[2] | | 23.7% |
| Cumene sulfonic acid | 8.1% | 8.1% |
| Monoethanolamine | 4.4% | 4.4% |
| MONAZOLINE O oleic imidazoline[3] | 0.60% | 0.60% |
| Butyl CARBITOL diethylene glycol monobutyl ether[1] | 18.7% | 18.7% |
| NAXAN AAL naphthalene sulfonate[4] | 18.7% | 18.7% |
| KOC617 diutan gum[5] | 2.0% | 2.0% |

[1]Dow Chemical Co.
[2]Dupont Nylon.
[3]Uniqema.
[4]Rütgers Organics Corp.
[5]CP Kelco.

Each concentrate formula was diluted 1:10 with water, allowed to thicken, and applied to a vinyl tile floor coated with five coats of hardened GEMSTAR LASER finish which had been applied using a 50 m²/L (2000 ft²/gallon) coating rate. The stripper formulations were allowed to stand on the floor finish for 10 minutes. In each case the stripper completely removed the finish. Formulation 10-1 stripped the finish more quickly than Formulation 10-2.

EXAMPLE 11

Using the method of Example 1, a series of concentrates was prepared by mixing the ingredients shown below in Table 7.

TABLE 7

| Ingredient | Form. 11-1 | Form. 11-2 | Form. 11-3 | Form. 11-4 | Form. 11-5 | Form. 11-6 | Form. 11-7 | Form. 11-8 |
|---|---|---|---|---|---|---|---|---|
| DOWANOL EPh ethylene glycol phenyl ether[1] | | | 23.7 g | | 23.7 g | 23.7 g | | 23.7 g |
| N-hydroxyethyl pyrrolidone | | | | 23.7 g | | 23.7 g | 23.7 g | 23.7 g |
| Butyl CARBITOL diethylene glycol monobutyl ether[1] | | 18.7 g | 18.7 g | | | | 18.7 g | 18.7 g |
| Cumene sulfonic acid | 8.1 g | 8.1 g | 8.1 g | 8.1 g | 8.1 g | 8.1 g | 8.1 g | 8.1 g |
| Monoethanolamine | 4.4 g | 4.4 g | 4.4 g | 4.4 g | 4.4 g | 4.4 g | 4.4 g | 4.4 g |
| KOC617 diutan gum[2] | 2.0 g | 2.0 g | 2.0 g | 2.0 g | 2.0 g | 2.0 g | 2.0 g | 2.0 g |

[1]Dow Chemical Co.
[2]CP Kelco.

One gram of each Formulation was diluted with water in the amounts shown below in Table 8.

TABLE 8

| Formulation | Weight of Water |
|---|---|
| 11-1 | 75.6 g |
| 11-2 | 32.5 g |
| 11-3 | 18.5 g |
| 11-4 | 28.1 g |
| 11-5 | 28.1 g |
| 11-6 | 16.9 g |
| 11-7 | 18.5 g |
| 11-8 | 12.7 g |

Each of the resulting stripper formulations was allowed to thicken, then applied to a vinyl tile floor coated with five coats of hardened GEMSTAR LASER finish which had been applied using a 50 m$^2$/L (2000 ft$^2$/gallon) coating rate. The stripper formulations were allowed to stand on the floor finish for 10 minutes. Formulations 11-3, 11-5, 11-6 and 11-8 completely removed the finish, and Formulations 11-1, 11-2, 11-4 and 11-7 partially removed the finish.

EXAMPLE 12

Using the method of Example 1, a series of concentrates was prepared by mixing the ingredients shown below in Table 9.

TABLE 9

| Ingredient | Form. 12-1 | Form. 12-2 | Form. 12-3 |
|---|---|---|---|
| DOWANOL EPh ethylene glycol phenyl ether[1] | 23.7 g | 23.7 g | 23.7 g |
| Cumene sulfonic acid | 8.1 g | 8.1 g | 8.1 g |
| Monoethanolamine | 4.4 g | 4.4 g | 4.4 g |
| KOC617 diutan gum[2] | 2.0 g | 2.0 g | 2.0 g |
| MONAZOLINE O oleic imidazoline[3] | 0.6 g | | 0.6 g |
| NAXAN AAL naphthalene sulfonate[4] | | 18.7 g | 18.7 g |

[1]Dow Chemical Co.
[2]CP Kelco.
[3]Uniqema.
[4]Rütgers Organics Corp.

One gram of each Formulation was then diluted with water in the amounts shown below in Table 10.

TABLE 10

| Formulation | Weight of Water |
|---|---|
| 12-1 | 27.6 g |
| 12-2 | 18.5 g |
| 12-3 | 18.3 g |

Each of the resulting stripper formulations was allowed to thicken, then applied to a vinyl tile floor coated with five coats of hardened GEMSTAR LASER finish which had been applied using a 50 m$^2$/L (2000 ft$^2$/gallon) coating rate. The stripper formulations were allowed to stand on the floor finish for 10 minutes. In each case the stripper completely removed the finish.

EXAMPLE 13

Using the method of Example 1, two concentrates were prepared by mixing the ingredients shown below in Table 11.

TABLE 11

| Ingredient | Form. 13-1 | Form. 13-2 |
|---|---|---|
| DOWANOL EPh ethylene glycol phenyl ether[1] | 23.7% | 15.56% |
| N-hydroxyethyl pyrrolidone | 23.7% | 15.56% |
| Cumene sulfonic acid | 8.1% | 10.63% |
| Monoethanolamine | 4.4% | 5.77% |
| MONAZOLINE O oleic imidazoline[2] | 0.60% | 0.79% |
| Butyl CARBITOL diethylene glycol monobutyl ether[1] | 18.7% | 24.54% |
| NAXAN AAL naphthalene sulfonate[3] | 18.7% | 24.54% |
| KOC617 diutan gum[4] | 2.0% | 2.62% |

[1]Dow Chemical Co.
[2]Uniqema.
[3]Rütgers Organics Corp.
[4]CP Kelco.

Formulation 13-1 formed a more stable emulsion than Formulation 13-2.

EXAMPLE 14

Using the method of Example 1, three concentrates were prepared by mixing the ingredients shown below in Table 12.

TABLE 12

| Ingredient | Form. 14-1 | Form. 14-2 | Form. 14-3 |
|---|---|---|---|
| DOWANOL EPh ethylene glycol phenyl ether[1] | 23.7% | 23.7% | 23.7% |
| N-hydroxyethyl pyrrolidone | 23.7% | 23.7% | 23.7% |
| Cumene sulfonic acid | 8.1% | 8.1% | 8.1% |
| Monoethanolamine | 4.4% | | |
| AMP-95 2-amino-2-methyl-1-propanol containing 5% water[2] | | 4.4% | |
| Diethylethanolamine | | | 4.4% |
| MONAZOLINE O oleic imidazoline[3] | 0.60% | 0.60% | 0.60% |
| Butyl CARBITOL diethylene glycol monobutyl ether[1] | 18.7% | 18.7% | 18.7% |
| NAXAN AAL naphthalene sulfonate[4] | 18.7% | 18.7% | 18.7% |
| KOC617 diutan gum[5] | 2.0% | 2.0% | 2.0% |

[1]Dow Chemical Co.
[2]Angus Chemical Co.
[3]Uniqema.
[4]Rütgers Organics Corp.
[5]CP Kelco.

The concentrates were evaluated to determine the stability of each emulsion against separation. The respective emulsion stabilities decreased in the order Formulation 14-1>Formulation 14-3>Formulation 14-2.

EXAMPLE 15

Using the method of Example 1, three concentrates were prepared by mixing the ingredients shown below in Table 13.

TABLE 13

| Ingredient | Form. 15-1 | Form. 15-2 | Form. 15-3 |
|---|---|---|---|
| DOWANOL EPh ethylene glycol phenyl ether[1] | 23.7 g | 23.7 g | 23.7 g |

TABLE 13-continued

| Ingredient | Form. 15-1 | Form. 15-2 | Form. 15-3 |
|---|---|---|---|
| Cumene sulfonic acid | 8.1 g | 8.1 g | 8.1 g |
| Monoethanolamine | 4.4 g | 4.4 g | 4.4 g |
| MONAZOLINE O oleic imidazoline[2] | 0.60 g | 0.60 g | 0.60 g |
| KOC617 diutan gum[3] | 2.0 g | 2.0 g | 2.0 g |
| N-hydroxyethyl pyrrolidone | 8 g | 16 g | 23.7 g |
| Butyl CARBITOL diethylene glycol monobutyl ether[1] | 6 g | 12 g | 18.7 g |

[1]Dow Chemical Co.
[2]Uniqema.
[3]CP Kelco.

The concentrates were evaluated to determine the stability of each emulsion against separation before and after addition of the last ingredient (diethylene glycol monobutyl ether). The presence of diethylene glycol monobutyl ether did not appear to adversely affect the concentrate emulsion stability.

EXAMPLE 16

Using the method of Example 1, a series of concentrates was prepared by mixing the ingredients shown below in Table 14.

TABLE 14

| Ingredient | Form. 16-1 | Form. 16-2 | Form. 16-3 | Form. 16-4 | Form. 16-5 | Form. 16-6 | Form. 16-7 | Form. 16-8 | Form. 16-9 | Form. 16-10 | Form. 16-11 |
|---|---|---|---|---|---|---|---|---|---|---|---|
| DOWANOL EPh ethylene glycol phenyl ether[1] | 37.9% | 41.2% | 29.2% | 29.4% | 31.3% | 23.9% | 58.8% | 39.9% | 23.9% | 49.6% | 56.9% |
| Cumene sulfonic acid | 13.0% | 14.1% | 10.0% | 10.0% | 10.7% | 8.2% | 10.0% | 13.6% | 8.2% | 16.9% | 19.4% |
| Monoethanolamine | 7.0% | 7.7% | 5.4% | 5.5% | 5.8% | 4.4% | 5.4% | 7.4% | 4.4% | 9.2% | 10.6% |
| KOC617 diutan gum[2] | 3.2% | 3.5% | 2.5% | 2.5% | 2.6% | 2.0% | 2.5% | 3.4% | 2.0% | 2.0% | 2.0% |
| MONAZOLINE O oleic imidazoline[3] | 1.0% | 1.0% | 0.7% | | | | | | | | |
| NAXAN AAL naphthalene sulfonate[4] | | | | 23.2% | 24.7% | 18.8% | 23.2% | 15.8% | 18.8% | 9.8% | 4.9% |
| N-hydroxyethyl pyrrolidone | 37.9% | | 29.2% | 29.4% | | 23.9% | | 19.9% | 11.9% | 12.4% | 6.2% |
| Butyl CARBITOL diethylene glycol monobutyl ether[1] | | 32.5% | 23.0% | | 24.7% | 18.8% | | | 30.7% | | |

[1]Dow Chemical Co.
[2]CP Kelco.
[3]Uniqema.
[4]Rütgers Organics Corp.

The concentrates were also evaluated to determine the stability of each emulsion against separation. The respective emulsion stabilities decreased in the order Formulation 16-4>Formulation 16-8>Formulation 16-10>Formulation 16-6>Formulation 16-11>Formulation 16-9>Formulation 16-7>Formulation 16-5>Formulation 16-1=Formulation 16-2=Formulation 16-3.

EXAMPLE 17

Using the method of Example 1, two concentrates were prepared containing different concentrations of a carrageenan thickener, by mixing the ingredients shown below in Table 15.

TABLE 15

| Ingredient | Form. 17-1 | Form. 17-2 |
|---|---|---|
| DOWANOL EPh ethylene glycol phenyl ether[1] | 39.9% | 35.9% |
| N-hydroxyethyl pyrrolidone | 19.9% | 17.9% |
| Cumene sulfonic acid | 13.6% | 12.2% |
| Monoethanolamine | 7.4% | 6.7% |
| NAXAN AAL naphthalene sulfonate[2] | 15.8% | 14.2% |
| GENUVISCO™ X-906-02 carrageenan gum[3] | 3.4% | 13.0% |

[1]Dow Chemical Co.
[2]Rütgers Organics Corp.
[3]CP Kelco.

Both formulations were diluted 1:10 with water. Formulation 17-2 thickened upon dilution to yield a mixture with a viscosity of approximately 300 cps. At the same dilution, Formulation 17-2 did not appreciably thicken.

EXAMPLE 18

Using the method of Example 1, two concentrates were prepared by mixing the ingredients shown below in Table 16.

TABLE 16

| Ingredient | Form. 18-1 | Form. 18-2 |
|---|---|---|
| DOWANOL EPh ethylene glycol phenyl ether[1] | 49.5% | 50.0% |
| Cumene sulfonic acid | 16.9% | 17.1% |
| Monoethanolamine | 9.1% | 9.1% |
| NAXAN AAL naphthalene sulfonate[2] | 19.5% | 19.6% |
| CELLOSIZE™ QP3L hydroxyethyl cellulose[1] | 0.80% | 0.80% |
| KELZAN Xanthan gum[3] | 4.2% | 3.4% |

[1]Dow Chemical Co.
[2]Rütgers Organics Corp.
[3]CP Kelco.

Both formulations were diluted 1:10 with water, and their viscosities measured using a Brookfield Viscometer and Spindle No. 6 at 50 rpm. The viscosities of both formulations increased upon dilution, with a higher increase observed for Formulation 18-2 as shown below in Table 17.

TABLE 17

| Formulation | Concentrate Viscosity (cps) | Use-solution Viscosity (cps) |
|---|---|---|
| 18-1 | 354 | 412 |
| 18-2 | 152 | 261 |

EXAMPLE 19

Using the method of Example 1, a series of concentrates was prepared by mixing the ingredients shown below in Table 18.

TABLE 18

| Ingredient | Form. 19-1 | Form. 19-2 | Form. 19-3 | Form. 19-4 |
|---|---|---|---|---|
| DOWANOL EPh ethylene glycol phenyl ether[1] | 46.4% | 50.3% | 48.0% | 43.2% |
| Cumene sulfonic acid | 16.4% | 17.2% | 16.4% | 14.8% |
| Monoethanolamine | 11.5% | 12.4% | 8.7% | 7.8% |
| NAXAN AAL naphthalene sulfonate[2] | 19.7% | 19.7% | 18.8% | 16.9% |
| KELZAN Xanthan gum[3] | | | 3.3% | |
| CARBOPOL ™ EZ3A polymeric thickener[4] | 0.95% | | | |
| CARBOPOL ULTREZ ™ 21 polymeric thickener[4] | | 0.50% | | |
| LAPONITE ™ B hydrous sodium lithium magnesium fluoro-silicate[5] | | | | 17.3% |
| Water | 5.1% | | 4.8% | |

[1]Dow Chemical Co.
[2]Rütgers Organics Corp.
[3]CP Kelco.
[4]Novion, Inc.
[5]Southern Clay Products.

The concentrate viscosities were measured using a Brookfield Viscometer and Spindle No. 6 at 50 rpm. The respective viscosities decreased in the order Formulation 19-2>Formulation 19-5>Formulation 19-4>Formulation 19-1>Formulation 19-3. The concentrates were also allowed to stand at room conditions overnight to evaluate the concentrate emulsion stability. The respective emulsion stabilities decreased in the order Formulation 19-2>Formulation 19-5>Formulation 19-3=Formulation 19-1>Formulation 19-4.

EXAMPLE 20

Using the method of Example 1, a series of concentrates was prepared by mixing the ingredients shown below in Table 19.

TABLE 19

| Ingredient | Form. 20-1 | Form. 20-2 | Form. 20-3 |
|---|---|---|---|
| DOWANOL EPh ethylene glycol phenyl ether[1] | 38.7% | 39.5% | 39.5% |
| Cumene sulfonic acid | 13.2% | 13.5% | 13.5% |
| Monoethanolamine | 7.2% | 7.3% | 7.3% |
| NAXAN AAL naphthalene sulfonate[2] | 15.3% | 15.6% | 15.6% |
| N-hydroxyethyl pyrrolidone | 19.3% | 19.7% | 19.7% |
| OPTIGEL ™ WA gellant[3] | 3.3% | | |
| OPTIGEL WM gellant[3] | | 3.4% | |
| OPTIGEL SH gellant[3] | | | 3.4% |
| ETHOQUAD ™ C/25 ethoxylated quaternary ammonium salt[4] | 3.0% | 1.0% | 1.0% |

[1]Dow Chemical Co.
[2]Rütgers Organics Corp.
[3]Süd-Chemie Catalysts Japan, Inc.
[4]Akzo Nobel Surface Chemistry LLC.

The respective emulsion stabilities decreased in the order Formulation 20-3>>Formulation 20-1=Formulation 20-2.

EXAMPLE 21

Using the method of Example 1, a series of concentrates was prepared using varying amounts of water to partially activate (in this instance, partially hydrate) a diutan gum thickener, by mixing the ingredients shown below in Table 20.

TABLE 20

| Ingredient | Form. 21-1 | Form. 21-2 | Form. 21-3 | Form. 21-4 | Form. 21-5 |
|---|---|---|---|---|---|
| DOWANOL EPh ethylene glycol phenyl ether[1] | 44.83% | 39.9% | 26.37% | 9.51% | 8.76% |
| Cumene sulfonic acid | 15.28% | 13.5% | 8.99% | 3.24% | 2.98% |
| Monoethanolamine | 8.31% | 7.4% | 4.89% | 1.76% | 1.62% |
| NAXAN AAL naphthalene sulfonate[2] | 17.75% | 15.8% | 10.44% | 3.76% | 3.47% |
| KOC617 diutan gum[3] | 3.82% | 3.4% | 2.25% | 0.81% | 0.75% |
| Water | 10.0% | 20.0% | 47.05% | 80.92% | 82.42% |

[1]Dow Chemical Co.
[2]Rütgers Organics Corp.
[3]CP Kelco.

Formulation 21-1, Formulation 21-2, Formulation 21-3 and Formulation 21-4 formed emulsions while in a concentrated state, while Formula 21-5 formed a thick gel. Formulation 21-1 and Formulation 21-2 were diluted 1:10 with water and observed to form mixtures of approximately 352 cps and 371 cps, respectively. The thick gel formed by Formulation 21-5 when in a concentrated state had a viscosity of approximately 1200 cps, and when diluted 1:1.4 with water had a lower viscosity of approximately 491 cps.

EXAMPLE 22

Using the method of Example 1, two concentrates were prepared by mixing the ingredients shown below in Table 21.

TABLE 21

| Ingredient | Form. 22-1 | Form. 22-2 |
|---|---|---|
| DOWANOL EPh ethylene glycol phenyl ether[1] | 37.16% | 36.41% |
| Cumene sulfonic acid | 12.58% | 12.32% |
| Monoethanolamine | 6.89% | 6.75% |

TABLE 21-continued

| Ingredient | Form. 22-1 | Form. 22-2 |
|---|---|---|
| NAXAN AAL naphthalene sulfonate[2] | 14.72% | 14.42% |
| Potassium sulfate | 0.5% | 2.0% |
| Water | 25.0% | 25.0% |
| KOC617 diutan gum[3] | 3.12% | 3.06% |

[1]Dow Chemical Co.
[2]Rütgers Organics Corp.
[3]CP Kelco.

Both of the formulations formed concentrate emulsions that could be diluted to form stripper formulations having a higher viscosity in the diluted state. Formulation 22-1 had slightly better emulsion stability than Formulation 22-2.

EXAMPLE 23

Using the method of Example 1, a series of concentrates was prepared by mixing the ingredients shown below in Table 22.

TABLE 22

| Ingredient | Form. 23-1 | Form. 23-2 | Form. 23-3 | Form. 23-4 |
|---|---|---|---|---|
| DOWANOL EPh ethylene glycol phenyl ether[1] | 35.39% | 31.77% | 33.86% | 35.95% |
| Cumene sulfonic acid | 11.98% | 10.75% | 11.46% | 12.17% |
| Morpholine | 11.83% | | | |
| Urea | | 17.10% | | |
| Monoethanolamine | | 3.76% | | |
| Benzyl ethanolamine | | | 15.65% | |
| Benzylamine | | | | 10.43% |
| NAXAN AAL naphthalene sulfonate[2] | 14.02% | 12.58% | 13.41% | 14.24% |
| Water | 23.81% | 21.37% | 22.78% | 24.19% |
| KOC617 diutan gum[3] | 2.97% | 2.67% | 2.84% | 3.02% |

[1]Dow Chemical Co.
[2]Rütgers Organics Corp.
[3]CP Kelco.

All four formulations formed concentrate emulsions that could be diluted to form stripper formulations having a higher viscosity in the diluted state. The respective emulsion stabilities decreased in the order Formulation 23-4>Formulation 23-3>Formulation 23-2>Formulation 23-1.

EXAMPLE 24

A sample of HAWK stripper concentrate (Ecolab, Inc.) was diluted 1:6 with water in a mop bucket and mixed with a mop. Approximately 40 g of Xanthan gum was quickly added in a pile on the surface of the solution. Mixing was attempted with a mop. Substantial globs of surface activated Xanthan gum remained in the mixture and could not be effectively dispersed using a mop. Further mixing using a cordless drill equipped with a stirring attachment did not appreciably disperse the Xanthan gum. A second addition of approximately 40 g of Xanthan gum was then performed by slowly pouring in the Xanthan gum with constant mixing using the drill and stirring attachment. This thickened the mixture, but required significant time to perform the slow addition and power mixing steps, and undispersed globs of Xanthan gum remained in the thickened stripper.

EXAMPLE 25

Using the method of Example 1, a series of concentrates was prepared by mixing the ingredients set out below in Table 23.

TABLE 23

| Ingredient | Form. 25-1 | Form. 25-2 | Form. 25-3 | Form. 25-4 | Form. 25-5 |
|---|---|---|---|---|---|
| DOWANOL EPh ethylene glycol phenyl ether[1] | 49.67% | 47.92% | 47.47% | 43.60% | 40.74% |
| Cumene sulfonic acid | 16.8% | 16.21% | 16.05% | 14.74% | 13.77% |
| Monoethanolamine | 9.22% | 8.90% | 8.81% | 8.09% | 7.56% |
| NAXAN AAL naphthalene sulfonate[2] | 19.66% | 18.97% | 18.79% | 17.26% | 16.13% |
| KOC617 diutan gum[3] | 4.64% | 8.00% | 8.87% | 16.29% | 21.78% |

[1]Dow Chemical Co.
[2]Rütgers Organics Corp.
[3]CP Kelco.

Formulation 25-1, Formulation 25-2 and Formulation 25-3 were diluted 1:14 with water. Using a 15 minute standing time, Formulation 25-1 and Formulation 25-2 were used to strip a grocery store floor that had been coated with a basecoat of MARKET STAR finish (Ecolab, Inc.) and GEMSTAR STRATUS finish topcoat (Ecolab, Inc.), both of which had been applied using a 50 m$^2$/L (2000 ft$^2$/gallon) coating rate.

The stripping performance was compared side-by-side to that of BRIGHTBLAST™ stripper (Ecolab, Inc.). All three stripper formulations removed 100% of the finish. The performances of Formulation 25-1 and Formulation 25-2 were both significantly better than BRIGHTBLAST in that Formulation 25-1 and Formulation 25-2 both remained where applied, and did not flow under shelving or into areas that were not intended to be stripped. When scrubbed using a swing machine, Formulation 25-1 was observed to flow at most 25-50 mm (1-2 in.), Formulation 25-2 less than 25 mm (less than 1 in.), and BRIGHTBLAST stripper up to 90 cm (up to 3 ft.) outside the machine path.

EXAMPLE 26

Using the method of Example 1, a thicken-upon-dilution formula was prepared and compared against a standard conventional stripper formula, by mixing the ingredients set out below in Table 24 below.

TABLE 24

| Ingredient | Form. 26-1 | Form. 26-2 |
|---|---|---|
| Water | 52.9% | |
| DOWANOL EPh ethylene glycol phenyl ether[1] | 11.4% | 23.7% |
| N-cyclohexyl-2-pyrrolidone | 11.4% | 23.7% |
| Cumene sulfonic acid | 3.9% | 8.1% |
| Monoethanolamine | 2.1% | 4.4% |
| MONAZOLINE O oleic imidazoline[2] | 0.3% | 0.6% |
| NAXAN AAL naphthalene sulfonate[3] | 9.0% | 18.7% |
| Butyl CARBITOL diethylene glycol monobutyl ether[1] | 9.0% | 18.7% |
| KOC617 diutan gum[3] | | 2.05% |

[1]Dow Chemical Co.
[2]Uniqema.
[3]Rütgers Organics Corp.
[4]CP Kelco.

Formulation 26-2 was diluted with water at ratios of 1:6, 1:9, and 1:12. The three use-dilutions were then compared against an experimental conventional stripper formula (Formulation 26-1) diluted at 1:3 to attain a desired viscosity and stripping power. The viscosities of the resulting stripper formulations were measured using a Brookfield viscometer and an HA No. 6 spindle at 100 rpm. The measured viscosities are shown below in Table 25.

TABLE 25

| Formula | Viscosity (cps) |
|---|---|
| Formulation 26-2 diluted 1:6 | 192.1 |
| Formulation 26-2 diluted 1:9 | 114.4 |
| Formulation 26-2 diluted 1:12 | 78.7 |
| Formulation 26-1 diluted 1:3 | 2.81 |

The strippers were evaluated on tiles which had been coated with either GEMSTAR LASER or ISI STAR finish at a 50 m$^2$/L (2000 ft$^2$/gallon) coating rate and aged at 50° C. for 5 days. Stripping performance was evaluated by determining the % of contact area stripped when a thin layer of the stripper was coated atop the tile and left on place for a 15 minute contact time ("thin layer test"), and when a thick layer of the stripper was placed atop the tile inside a foam ring and left in place for a 10 minute contact time ("foam ring test"). For the GEMSTAR LASER coated tiles, all four stripper formulations removed 100% of the finish in the thin layer test. In the ring test, the 1:12 dilution of Formulation 26-2 removed approximately 90% of the finish while the other three stripper formulations removed 100% of the finish. For the ISI STAR coated tiles, the 1:6 dilution of Formulation 26-2 and Formulation 26-1 both removed 100% of the finish in both tests. The 1:9 dilution of Formulation 26-2 removed 60% of the finish in the ring test and 100% in the thin layer test. The 1:12 dilution of Formulation 26-2 removed 10% of the finish in the ring test and 70% in the thin layer test.

EXAMPLE 27

Using the method of Example 1, a series of thicken-upon-dilution formulations employing clay to stabilize the concentrate emulsion were prepared by mixing the ingredients in Table 26 in the order listed.

TABLE 26

| Ingredient | Formulation Number | | | | | | | |
|---|---|---|---|---|---|---|---|---|
| | 27-1 | 27-2 | 27-3 | 27-4 | 27-5 | 27-6 | 27-7 | 27-8 |
| Benzyl alcohol | 73.6% | 73.0% | | | | 74.0% | 74.0% | |
| DOWANOL EPH ethylene glycol phenyl ether[1] | | | 74.2% | 73.4% | 73.0% | | | 73.6% |
| GARAMITE ™ 1958 clay[2] | 0.75% | 1.50% | | 0.76% | 1.51% | 0.27% | 0.27% | 0.75% |
| K1C626 diutan gum[3] | 6.0% | 5.9% | 6.1% | 6.0% | 5.9% | | 6.0% | |
| Water | 4.9% | 4.9% | 4.9% | 5.2% | 4.9% | 4.9% | 4.9% | 4.9% |
| Monoethanolamine | 14.7% | 14.6% | 14.8% | 14.7% | 14.6% | 14.8% | 14.8% | 14.7% |
| K1C626 diutan gum[3] | | | | | | 6.0% | | 6.0% |

[1]Dow Chemical Co.
[2]Southern Clay Products, Inc.
[3]CP Kelco.

The resulting concentrates were allowed to sit at room conditions for approximately 1½ days, after which the emulsion stability was evaluated by calculating the ratio of the separated layer height to the total solution height expressed as a percentage. Formulations 27-1 through 27-5 were shaken to redistribute any separated material, and the viscosity measured using a Brookfield viscometer and Spindle No. 6 at 50 rpm. Formulations 27-1 through 27-5 were also diluted 1:8 and 1:16 with water. The viscosities of the resulting use-dilutions were measured in the same manner as for the concentrates. Set out below in Table 27 are the measured viscosities.

TABLE 27

| Condition | Formulation Number | | | | | | | |
|---|---|---|---|---|---|---|---|---|
| | 27-1 | 27-2 | 27-3 | 27-4 | 27-5 | 27-6 | 27-7 | 27-8 |
| % dispersed | 82.4% | 65.8% | 43.2% | 75.3% | 96.4% | 25.6% | 41.3% | 37.5% |
| Concentrate viscosity | 105 cps | 112 cps | 113 cps | 292 cps | 700 cps | | | |

TABLE 27-continued

| Condition | Formulation Number | | | | | | | |
|---|---|---|---|---|---|---|---|---|
| | 27-1 | 27-2 | 27-3 | 27-4 | 27-5 | 27-6 | 27-7 | 27-8 |
| 1:8 Use-dilution viscosity | 750 cps | 460 cps | 800 cps | 900 cps | 1095 cps | | | |
| 1:16 Use-dilution viscosity | 240 cps | 210 cps | 305 cps | 335 cps | 450 cps | | | |

EXAMPLE 28

Using the method of Example 1, a series of thicken-upon-dilution formulations employing copolymers of acrylic acid to stabilize the concentrate emulsion were prepared by mixing the ingredients in Table 28 in the order listed.

TABLE 28

| Ingredient | 28-1 | 28-2 | 28-3 | 28-4 | 28-5 |
|---|---|---|---|---|---|
| DOWANOL EPH ethylene glycol phenyl ether[1] | 77.8% | 74.1% | 77.2% | 73.4% | 76.8% |
| Carbopol EZ3A copolymer[2] | 0.26% | 0.25% | 1.0% | 0.95% | 1.5% |
| K1C626 diutan gum[3] | 6.3% | 6.0% | 6.3% | 6.0% | 6.2% |
| Monoethanolamine | 15.6% | 14.8% | 15.4% | 14.6% | 15.4% |
| Water | | 4.8% | | 4.9% | |

[1]Dow Chemical Co.
[2]Noveon, Inc.
[3]CP Kelco.

The resulting concentrates were allowed to sit at room conditions for 6 days, after which the emulsion stability was evaluated by calculating the ratio of the separated layer height to the total solution height expressed as a percentage. Formulations 28-1, 28-3 and 28-5 were shaken to redistribute any separated material, and the viscosity measured using a Brookfield viscometer and Spindle No. 6 at 50 rpm. Formulation 28-5 was also diluted 1:14 with water. The viscosity of the resulting use-dilution was measured in the same manner as for the concentrates. Set out below in Table 29 are the measured viscosities.

TABLE 29

| Condition | 28-1 | 28-2 | 28-3 | 28-4 | 28-5 |
|---|---|---|---|---|---|
| Concentrate appearance | Tan suspension | Tan suspension | Tan suspension | Tan suspension | Tan suspension |
| % dispersed | 23.2% | 32.8% | 45.8% | 45.4% | 50.7 |
| Concentrate viscosity | 41 cps | | 64 cps | | 77 cps |
| 1:14 Use-dilution viscosity | | | | | 600 cps |

Various modifications and alterations of this invention will be apparent to those skilled in the art without departing from the scope and spirit of this invention. It should be understood that this invention is not limited to the illustrative embodiments set forth above.

We claim:

1. A method for stripping a floor comprising:
   a) providing a substantially nonchlorinated concentrate comprising a floor finish solvent and an at least partially unactivated water thickener;
   b) diluting the concentrate merely with water at an intended use location to activate the water thickener and noticeably increase within ten minutes or less the viscosity of the resulting mixture;
   c) applying the resulting thickened stripper to a hardened floor finish atop a floor,
   d) allowing the applied stripper to soften or dissolve the floor finish; and
   e) removing the softened or dissolved finish from the floor.

2. A method according to claim 1 wherein the concentrate is homogenous before dilution.

3. A method according to claim 1 wherein the concentrate is homogenous for 1 minute or more after being shaken to redisperse any separated thickener particles.

4. A method according to claim 1 wherein the solvent comprises benzyl alcohol.

5. A method according to claim 1 wherein the solvent comprises a dibasic ester, essential oil, dialkyl carbonate or mixture thereof.

6. A method according to claim 1 wherein the solvent comprises ethylene glycol monobutyl ether, diethylene glycol monobutyl ether, ethylene glycol phenyl ether, propylene glycol phenyl ether, or mixture thereof.

7. A method according to claim 1 wherein the solvent comprises at least 20 percent of the total concentrate weight.

8. A method according to claim 1 wherein the solvent comprises at least 30 percent of the total concentrate weight.

9. A method according to claim 1 wherein the solvent comprises at least 40 percent of the total concentrate weight.

10. A method according to claim 1 wherein the water thickener comprises a gum, alginate, cellulose ether, natural or synthetic clay, acrylic acid copolymer; polyethylene oxide, polyvinyl alcohol, polyvinyl pyrrolidone, starch, methyl vinyl ether/maleic anhydride copolymer, or mixture thereof.

11. A method according to claim 1 wherein the water thickener comprises Xanthan gum, diutan gum or gellan gum.

12. A method according to claim 1 wherein the water thickener comprises carrageenan, cassia gum, gellan gum, guar gum, Gum Arabic, Gun Tragacanth, locust bean gum or whelan gum.

13. A method according to claim 1 wherein the water thickener comprises a natural or synthetic clay.

14. A method according to claim 1 wherein the water thickener comprises about 0.1 to about 10 percent of the total concentrate weight.

15. A method according to claim 1 wherein the water thickener comprises about 2 to about 8 percent of the total concentrate weight.

16. A method according to claim 1 wherein the concentrate further comprises surfactant at about 0.1 to about 50 percent of the total concentrate weight.

17. A method according to claim 1 wherein the water thickener is partially activated while in the concentrate.

18. A method according to claim 1 wherein the concentrate is provided in a single container.

19. A method according to claim 1 wherein the concentrate is provided in a first container comprising the floor finish solvent and a second container comprising at least partially unactivated water thickener.

20. A method according to claim 1 wherein the concentrate is diluted with water in at least a 1:5 by volume dilution ratio.

21. A method according to claim 1 wherein the concentrate is diluted with water in at least a 1:10 by volume dilution ratio.

22. A method according to claim 1 wherein the composition is diluted with water by mixing in a bucket.

23. A method according to claim 1 wherein the composition is applied to the finish using a flat or string mop, squeegee, roller or towel.

24. A method according to claim 1 wherein the viscosity noticeably increases within 2 minutes or less after dilution with water.

25. A method according to claim 1 wherein the composition is applied to a hardened floor finish atop a resilient flooring substrate.

26. A method for stripping a floor comprising:
a) providing a substantially nonchlorinated concentrate comprising a floor finish solvent comprising benzyl alcohol, a dibasic ester, an essential oil, a dialkyl carbonate, ethylene glycol monobutyl ether, diethylene glycol monobutyl ether, ethylene glycol phenyl ether, propylene glycol phenyl ether, or mixture thereof; an at least partially unactivated water thickener comprising Xanthan gum, diutan gum, gellan gum, natural clay, synthetic clay, or mixture thereof; and less than 3 percent water based on the concentrate weight;
b) diluting the concentrate merely with water at an intended use location to activate the water thickener and noticeably increase within ten minutes or less the viscosity of the resulting mixture;
c) applying the resulting thickened stripper to a hardened floor finish atop a resilient flooring substrate;
d) allowing the applied stripper to soften or dissolve the floor finish; and
e) removing the softened or dissolved finish from the floor.

27. A method according to claim 1 wherein the concentrate is an emulsion.

28. A method according to claim 1 wherein the concentrate is a liquid.

29. A method according to claim 1 wherein the concentrate is a gel.

30. A method according to claim 1 wherein the concentrate comprises a chelant.

31. A method according to claim 1 wherein the concentrate comprises a pH adjuster.

32. A method according to claim 1 wherein the thickener comprises a homopolymer or copolymer of acrylic acid, or mixture thereof.

33. A method according to claim 1 wherein the thickener comprises an associative thickener.

* * * * *